United States Patent
Harada et al.

(10) Patent No.: US 11,792,751 B2
(45) Date of Patent: Oct. 17, 2023

(54) USER TERMINAL AND RADIO COMMUNICATION METHOD

(71) Applicant: NTT DOCOMO, INC., Tokyo (JP)

(72) Inventors: Hiroki Harada, Tokyo (JP); Hideaki Takahashi, Tokyo (JP); Yuichi Kakishima, Tokyo (JP); Kazuaki Takeda, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 74 days.

(21) Appl. No.: 17/057,157

(22) PCT Filed: May 21, 2018

(86) PCT No.: PCT/JP2018/019490
§ 371 (c)(1),
(2) Date: Nov. 20, 2020

(87) PCT Pub. No.: WO2019/224871
PCT Pub. Date: Nov. 28, 2019

(65) Prior Publication Data
US 2021/0204231 A1   Jul. 1, 2021

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 72/0453* (2013.01); *H04W 72/23* (2023.01)

(58) Field of Classification Search
CPC ..... H04W 24/08; H04W 24/10; H04W 36/06; H04W 72/042; H04W 72/085; H04W 76/28; H04W 76/19
See application file for complete search history.

(56) References Cited

U.S. PATENT DOCUMENTS

2019/0052377 A1* 2/2019 Hwang ............... H04W 24/08
2019/0174466 A1* 6/2019 Zhang ............... H04W 72/042
(Continued)

OTHER PUBLICATIONS

Extended European Search Report issued in counterpart European Patent Application No. 18919656.1, dated Dec. 23, 2021 (8 pages).
(Continued)

*Primary Examiner* — Chi Ho A Lee
*Assistant Examiner* — Andrew Lee
(74) *Attorney, Agent, or Firm* — Osha Bergman Watanabe & Burton LLP

(57) ABSTRACT

To appropriately control communication using at least one of a synchronization signal block and a reference signal even when communication is performed using a BWP, according to one aspect of the present disclosure, there is provided a user terminal including: a receiving section that receives at least one of a synchronization signal block and a given reference signal in a given bandwidth part (BWP); and a control section that decides whether to apply a synchronization signal block to a specific operation based on at least one of information regarding a frequency position of a synchronization signal block commonly reported by a serving cell and information regarding a frequency position of a synchronization signal block in the BWP.

7 Claims, 12 Drawing Sheets

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 2019/0222290 A1* | 7/2019 | Ly | .......................... | H04W 76/28 |
| 2019/0230550 A1* | 7/2019 | Yiu | ....................... | H04W 24/10 |
| 2019/0261244 A1* | 8/2019 | Jung | ...................... | H04W 36/06 |
| 2019/0289513 A1* | 9/2019 | Jeon | .................. | H04W 72/0453 |
| 2019/0313411 A1* | 10/2019 | Ly | .......................... | H04W 76/19 |
| 2020/0274679 A1* | 8/2020 | Futaki | ................... | H04W 24/08 |
| 2020/0275319 A1* | 8/2020 | Murray | ................ | H04B 7/0617 |
| 2020/0344019 A1* | 10/2020 | Da Silva | ............... | H04W 24/10 |
| 2021/0127399 A1* | 4/2021 | Kou | .................... | H04W 72/085 |

OTHER PUBLICATIONS

Ericsson; "BWP and RLM in NR"; 3GPP TSG-RAN WG2 #100, Tdoc R2-1713733; Reno, USA; Nov. 27-Dec. 1, 2017 (3 pages).
International Search Report issued in Application No. PCT/JP2018/019490, dated Aug. 7, 2018 (4 pages).
Written Opinion issued in International Application No. PCT/JP2018/019490, dated Aug. 7, 2018 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Office Action issued in Japanese Application No. 2020-520869 dated Apr. 19, 2022 (6 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, the specifications of LTE-A (LTE Advanced, LTE Rel.10, 11, 12, and 13) have been drafted for the purpose of further increasing the capacity and sophistication of LTE (LTE Rel.8, 9) and so on.

Successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel.14 or 15 or later versions") have also been under study.

In the existing LTE system (for example, LTE Rel.8 to 13), a user terminal (UE (User Equipment)) detects a synchronization signal (SS) to be synchronized with a network (for example, a base station (eNB (eNode B))), and identifies a cell to be connected (for example, identifies by a cell ID (Identifier)). Such processing is also referred to as cell search. The synchronization signal includes, for example, PSS (Primary Synchronization Signal) and/or SSS (Secondary Synchronization Signal)).

In addition, the UE receives broadcast information (for example, a master information block (MIB), a system information block (SIB), etc.), and acquires configuration information for communication with the network (which may also be referred to as "system information" and so on).

The MIB may be transmitted on a broadcast channel (PBCH (Physical Broadcast Channel)). The SIB may be transmitted on a downlink (DL) shared channel (PDSCH (Physical Downlink Shared Channel)).

CITATION LIST

Non-Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (hereinafter, also simply referred to as NR), it is assumed to use a synchronization signal block (SSB) for a specific operation (for example, measurement, monitoring, etc.).

Use of one or more partial frequency bands (also referred to as "partial bands," "bandwidth parts (BWPs)" and so on) in carriers (also referred to as component carriers (CCs), system bands and so on) for DL and/or UL communication (DL/UL communication) has been under study in NR.

When a plurality of frequency bands used for DL/UL communication (for example, BWP) are configured in carriers in this way, activation/deactivation of a plurality of BWPs is controlled by switching.

Further, the SSB is not necessarily included in each BWP, and hence when activation/deactivation of BWPs is controlled by switching, which signal (for example, SSB or any of other reference signals) is to be used for a specific operation in each BWP becomes a problem. If various operations using the SSB cannot be properly implemented, communication quality may deteriorate.

Therefore, one of the objects of the present disclosure is to provide a user terminal and a radio communication method that can appropriately control communication using at least one of a synchronization signal block and a reference signal even when communication is performed using a BWP.

Solution to Problem

According to one aspect of the present disclosure, there is provided a user terminal including: a receiving section that receives at least one of a synchronization signal block and a given reference signal in a given bandwidth part (BWP); and a control section that decides whether to apply a synchronization signal block to a specific operation based on at least one of information regarding a frequency position of a synchronization signal block commonly reported by a serving cell and information regarding a frequency position of a synchronization signal block in the BWP.

Advantageous Effects of Invention

According to one aspect of the present disclosure, even when communication is performed using the BWP, communication can be appropriately controlled using at least one of the synchronization signal block and the reference signal.

DESCRIPTION OF EMBODIMENTS

Assignment of carriers (also referred to as "CC (Component Carrier)," "cell," "system band" and so on) with a broader bandwidth (100 to 800 MHz, for example) than that in existing LTE systems (LTE Rel.8 to 13, for example) has been under study in NR.

Further, NR is expected to have both a user terminal (also referred to as a WB (Wideband) UE, single carrier WB UE and so on) having a capability of performing transmission and/or reception (transmission/reception) over the entire carrier and a user terminal (also referred to as a BW (Bandwidth) reduced UE and so on) with no capability of performing transmission/reception over the entire carrier.

Thus, the future radio communication systems are expected to have a plurality of user terminals (various BW UE capabilities) in a supported bandwidth. In view of this, quasi-static configuring of one or more partial frequency bands in a carrier has been under study. Each frequency band (for example, 50 MHz or 200 MHz) in the carrier is referred to as a "partial band," a "bandwidth part (BWP)" and so on.

Figure 1A:
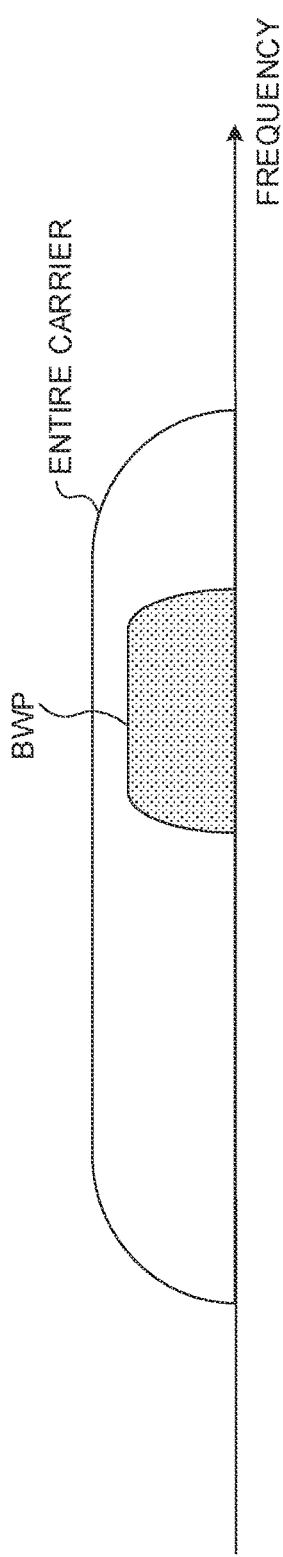
FIGS. 1A to 1C are diagrams illustrating an example of a BWP configuration scenario.

FIG. 1 is a diagram illustrating an example of a BWP configuration scenario. FIG. 1A illustrates a scenario (Usage scenario #1) in which one BWP is configured for a user terminal in one carrier. For example, in FIG. 1A, a BWP of 200 MHz is configured in a carrier of 800 MHz. Activation or deactivation of the BWP may be controlled.

The activation of the BWP means making the BWP available (or transition to the available state), and is also referred to as activation, enabling, or the like, of configuration information of the BWP (BWP configuration information). The deactivation of the BWP means making the BWP unavailable (or transition to the unavailable state), and is also referred to as deactivation, disabling, or the like, of the BWP configuration information. A BWP is scheduled so as to be activated.

Figure 1B:
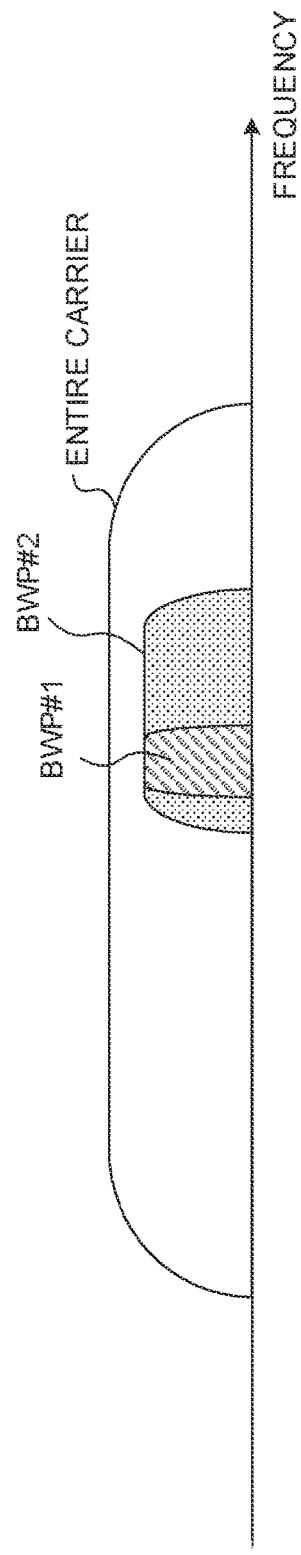

FIG. 1B illustrates a scenario (Usage scenario #2) in which a plurality of BWPs are configured for a user terminal in one carrier. As illustrated in FIG. 1B, at least a part of the plurality of BWPs (for example, BWPs #1 and #2) may overlap with each other. For example, in FIG. 1B, the BWP #1 is a partial frequency band of the BWP #2.

Activation or deactivation of at least one of the plurality of BWPs may be controlled. For example, in FIG. 1B, the BWP #1 may be activated when data transmission/reception is not performed, and the BWP #2 may be activated when data transmission/reception using the BWP #2 is performed. Specifically, when data transmitted/received by the BWP #2 occurs, switching from the BWP #1 to the BWP #2 is performed. When there is no scheduling for the given time BWP #2 after the transmission/reception of data ends, and a timer expires or data transmission/reception using the BWP #1 occurs, switching from the BWP #2 to the BWP #1 may be performed. As a result, the user terminal does not need to constantly monitor the BWP #2 with a broader bandwidth than the BWP #1, and therefore power consumption can be reduced.

Figure 1C:
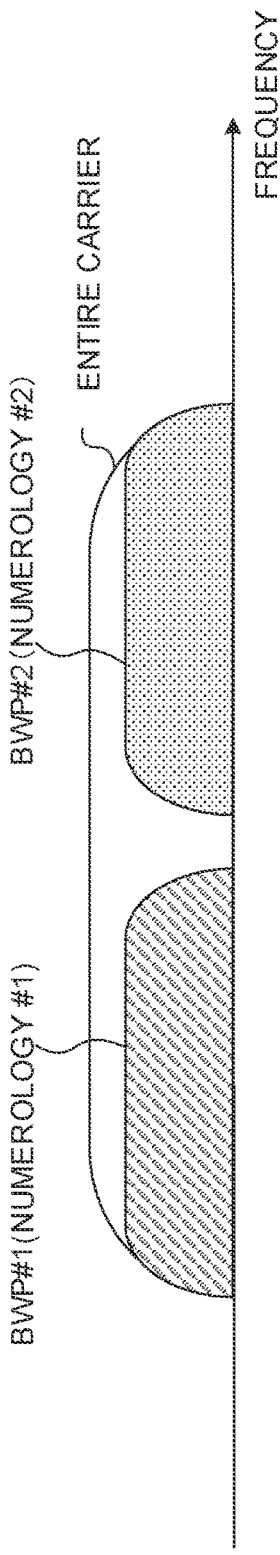

FIG. 1C illustrates a scenario (Usage scenario #3) in which a plurality of BWPs are configured in different bands within one carrier. As illustrated in FIG. 1C, the plurality of BWPs may employ different numerologies. Here, the numerologies may be at least one of subcarrier interval, symbol length, slot length, cyclic prefix (CP) length, slot (transmission time interval (TTI)) length, the number of symbols per slot and so on.

For example, in FIG. 1C, the BWPs #1 and #2 with different numerologies are configured for a user terminal having the capability of performing transmission/reception over the entire carrier. In FIG. 1C, at least one BWP configured for the user terminal is activated or deactivated, and one or more BWPs may be active at a certain time point.

The BWP used for DL communication may be referred to as a "DL BWP (frequency band for DL)," and the BWP used for UL communication may be referred to as an "UL BWP (frequency band for UL)." The frequency bands of the DL BWP and the UL BWP may at least partially overlap with each other. Hereinafter, the DL BWP and the UL BWP are referred to as BWP, when they are not distinguished from each other.

Figure 2:
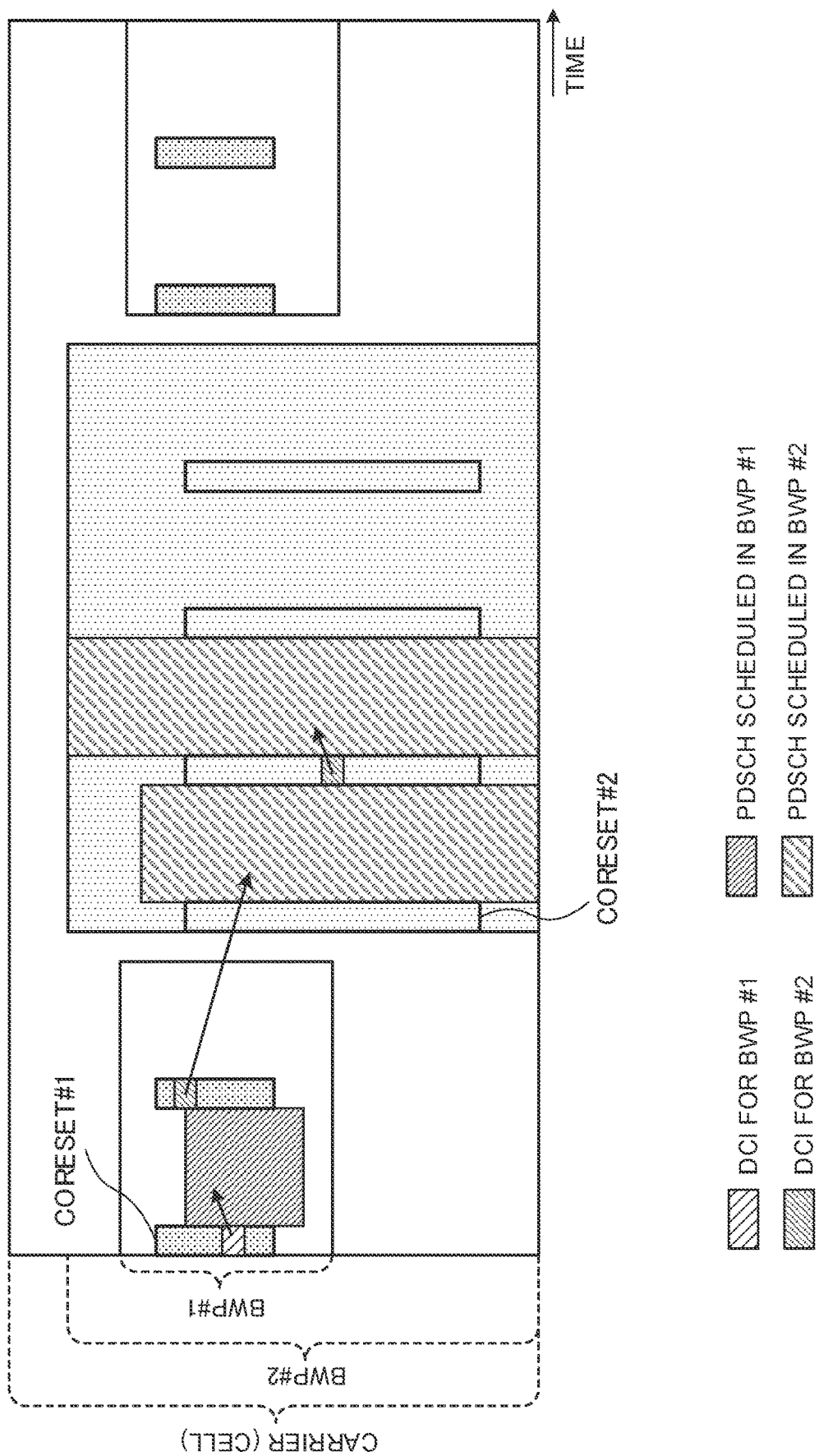
FIG. 2 is a diagram illustrating an example of activation/deactivation control of a BWP.

Control on activation and/or deactivation (also referred to as activation/deactivation or switching, determination and so on) of the BWP will be described with reference to FIG. 2. FIG. 2 is a diagram illustrating a control example in a case of activating one BWP (switching activated BWPs). In FIG. 2, the scenario illustrated in FIG. 1B is assumed, but the activation/deactivation control of the BWP can be applied as appropriate to the scenarios illustrated in FIGS. 1A and 1C or the like.

Furthermore, in FIG. 2, a control resource region (CORESET #1) that is an allocation candidate of a DL control channel (DCI) is configured in the BWP #1, and CORESET #2 is configured in the BWP #2. Each of the CORESET #1 and the CORESET #2 is provided with one or more search spaces. For example, in the CORESET #1, the DCI for the BWP #1, and the DCI for the BWP #2 may be arranged in the same search space, or may be arranged in different search spaces.

Furthermore, in FIG. 2, when the BWP #1 is in the active state, the user terminal monitors the search space in the CORESET #1 within a given cycle (for example, for each one or more slots, for each one or more minislots, or for each given number of symbols) (blind decoding), to detect the DCI for the user terminal.

The DCI may include information indicating the BWP corresponding to the DCI (BWP information). The BWP information is, for example, a BWP index, and may be a given field value in the DCI. Furthermore, the BWP index information may be included in a downlink scheduling DCI, may be included in an uplink scheduling DCI, or may be included in a common search space DCI. The user terminal may determine the BWP for which PDSCH or PUSCH is scheduled by the DCI, based on the BWP information in the DCI.

When the user terminal detects the DCI for the BWP #1 in the CORESET #1, the user terminal receives PDSCH scheduled in (assigned to) a given time and/or frequency resource (time/frequency resource) in the BWP #1 based on the DCI for the BWP #1.

When the DCI for the BWP #2 is detected in the CORESET #1, the user terminal deactivates the BWP #1 and activates the BWP #2. The user terminal receives the PDSCH scheduled in a given time/frequency resource of the DL BWP #2 based on the DCI for the BWP #2 detected in the CORESET #1.

When the BWP #2 is activated, the user terminal monitors the search space in the CORESET #2 within a given cycle (for example, for each one or more slots, for each one or more minislots, or for each given number of symbols) (blind decoding), to detect the DCI for the BWP #2. The user terminal may receive the PDSCH scheduled in a given time/frequency resource of the BWP #2 based on the DCI for the BWP #2 detected in the CORESET #2.

Furthermore, when a data channel (for example, PDSCH and/or PUSCH) in the activated BWP is not scheduled for a given period of time, the BWP may be deactivated. For example, in FIG. 2, the user terminal deactivates the BWP #2 and activates the BWP #1 because PDSCH is not scheduled in the DL BWP #2 for a given period of time.

The maximum number of BWPs that can be configured per carrier may be given. For example, in frequency division duplex (FDD) (paired spectrum), a maximum of four DL BWPs and a maximum of four UL BWPs may be configured per carrier. The UE receives data and so on by using the activated BWP (for example, one BWP) among the maximum N (for example, N=4) BWPs configured by a base station.

A default BWP may be defined in the user terminal. The default BWP may be the above-mentioned initial active BWP, or may be configured by higher layer signaling (for example, RRC signaling).

In this way, different frequency positions and bandwidths can be configured for each BWP. The UE tunes the reception frequency and bandwidth according to the frequency position and bandwidth of the activated BWP (for example, DL BWP).

The user terminal that supports the entire carrier will be able to receive and/or transmit signals outside the activated BWP to some extent. On the other hand, since the reception frequency and the bandwidth are configured according to the activated BWP, reception of signals or channels transmitted outside the band of the BWP is limited.

For example, it is conceivable that the UE performs measurement using a synchronization signal block (SSB) transmitted in a frequency domain outside the range of the active DL BWP (for example, RRM measurement (Radio Resource Management Measurement)). In this case, since the measurement using the SSB is performed by using the measurement gap, data reception from the serving cell is limited within the measurement gap.

The SSB is a signal block including a synchronization signal (SS) and a broadcast channel (which may be also be referred to as a "broadcast signal," "PBCH," "NR-PBCH" and so on), and may be referred to as "SS/PBCH block" and so on.

The SS included in the SSB may include a primary synchronization signal (PSS), a secondary synchronization signal (SSS) and so on. The SSB is composed of one or more symbols (for example, OFDM symbols). Within the SSB, the PSS, the SSS, and the PBCH may be arranged in one or more different symbols. For example, the SSB may be composed of a total of four or five symbols including one symbol PSS, one symbol SSS, and two or three symbol PBCH.

On the other hand, it is necessary to monitor PDCCH in CORESET and the search space in the active BWP to receive DCI. In addition, it is necessary to perform radio link monitoring (RLM), beam management using the SSB, beam failure detection, and so on using with a reference signal in the active BWP (for example, SSB or CSI-RS).

Therefore, radio link monitoring using the SSB, beam management, beam failure detection, and so on can be performed only when the SSB is included in the BWP. That is, the UE cannot perform these operations using the SSB in the DL BWP not including the SSB.

Incidentally, the SSB is considered to be transmitted at a plurality of frequency positions within a carrier. In a cell that supports initial access (stand-alone), the SSB and given system information (for example, RMSI such as SIB1) are transmitted on at least one frequency. The SSB is transmitted by a sync raster searched by the UE at the time of initial access.

In a cell that does not support initial access (non-stand-alone), the given system information (RMSI) may not be transmitted, and the base station uses a higher layer (for example, RRC signaling) to report one frequency position of the SSB to the UE.

At present, use of the SSB for RRM measurement has been under study, but it is conceivable to use the SSB for purposes other than RRM measurement. For example, it is conceivable to use the SSB for at least one of the following operations.

(1) Radio link monitoring (RLM)
(2) Beam recovery
(3) Beam management
(4) State of transmission configuration indicator (TCI) (TCI state)

The beam recovery may include at least one of beam failure detection and candidate beam detection. The beam management may be measurement for L1-RSRP (Reference Signal Received Power (RSRP) at the physical layer).

The TCI state (TCI state) corresponds to a pseudo collocation (QCL (Quasi-Co-Location)) state. Further, the TCI state is roughly classified into a TCI state for PDCCH and a TCI state for PDSCH. The TCI state may be, for example, information regarding a QCL of a target channel (or a reference signal for the channel (RS (Reference Signal))) and another signal (for example, another downlink reference signal (DL-RS (Downlink Reference Signal))). For example, the TCI state may be information regarding a spatial QCL (which may also be referred to as "QCL type-D") of DMRS for PDCCH or PDSCH and another DL signal (for example, SSB or CSI-RS), and may be used to determine a reception beam pattern when PDCCH or PDSCH is received.

As described above, when the above operations (1) to (4) (hereinafter, also referred to as various operations) are performed by using the SSB, how to control becomes a problem.

At present, as the SSB of the serving cell, the base station is supported to report one frequency to the UE by using a higher layer (for example, RRC signaling). The base station uses a given information element (frequencyInfoDL in ServingCellConfigCommon) to specify the frequency of one SSB to the UE.

Figure 3A:
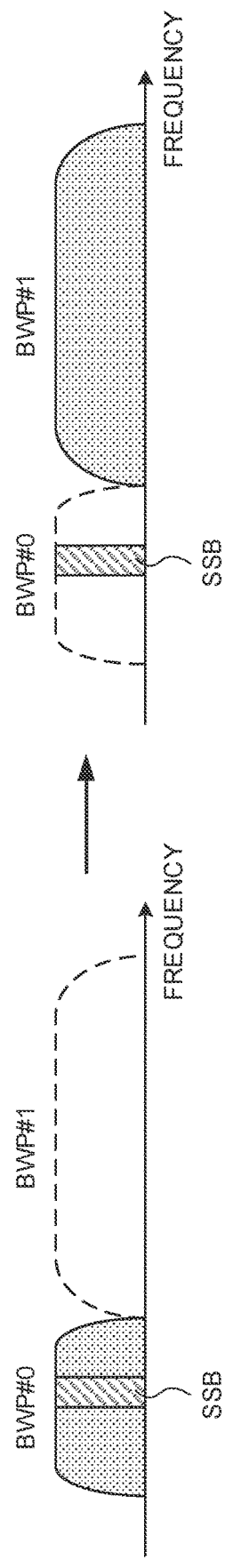
FIG. 3A and FIG. 3B are diagrams for explaining switching between a SSB included in a BWP and a BWP.

However, it is also assumed that a plurality of BWPs are configured for the UE, and there is a BWP that includes a frequency domain in which the SSB is transmitted and a BWP not including the frequency domain in the plurality of configured BWPs. In such a case, how to control various operations in the case of performing switching between the BWP including the SSB and the BWP not including the SSB (for example, the case of switching the active BWP) becomes a problem (see FIG. 3A). FIG. 3A illustrates a case where the active state is switched from a BWP #0 including the SSB to the BWP #1 not including the SSB.

Figure 3B:
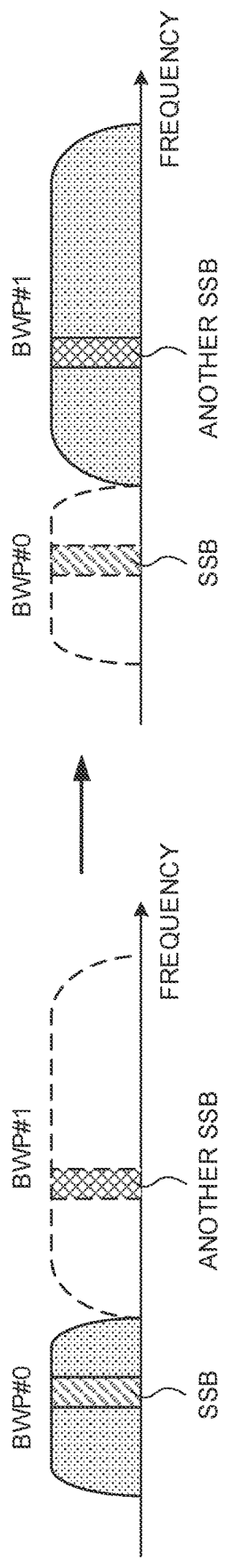

Alternatively, it is also conceivable that the SSB can be transmitted in each band of the plurality of configured BWPs. However, if only one SSB frequency position is specified in a given information element (ServingCellConfigCommon), the UE may not be able to grasp the frequency position of the SSB when the BWP not including the SSB is activated from the BWP including the SSB (see FIG. 3B). FIG. 3B illustrates a case where the active state is switched from the BWP #0 including the SSB of which frequency position is reported by a given information element to the BWP #1 not including the SSB (including another SSB not reported by the given information element).

The present inventors have focused on the presence or absence of the SSB in the BWP to be configured or the BWP to be activated, or the type of SSB (for example, whether or not it is the SSB reported by the given information element), and have conceived to decide whether to apply the synchronization signal block to various operations based on the information reported from the base station.

Hereinafter, embodiments according to the present disclosure will be described in detail with reference to the drawings. The respective aspects may be applied individually or in combination. Further, in the following description, the above operations (1) to (4) will be described as examples of various operations, but the operation using the SSB may be at least one of (1) to (4). Further, the various operations are not limited to the above items (1) to (4).

(First Aspect)

In the first aspect, in the DL BWP including the SSB (hereinafter, also simply referred to as "BWP"), control is made to perform various operations by using the SSB of the BWP.

The base station may report, to the UE, information regarding the correspondence between the SSB frequency position and the BWP. For example, when the base station configures a plurality of BWPs in the UE, the information regarding the frequency position of the SSB corresponding to the BWP including the frequency of the SSB is reported to the UE.

As an example, the base station reports the BWP that includes the SSB (given BWP index), including information indicating the frequency position of the SSB (for example, absoluteFrequencySSB), in the BWP information element (BWP IE) reported in the higher layer.

For the activated BWP, the UE performs various operations using the SSB by referring to the information regarding the frequency position of the SSB related to the BWP (for example, absoluteFrequencySSB in the BWP IE). When the active BWP is switched due to downlink control information, timer expiration, or the like, the UE performs control so as to switch the SSB referred to in various operations (see FIG. 4A).

Figure 4A:
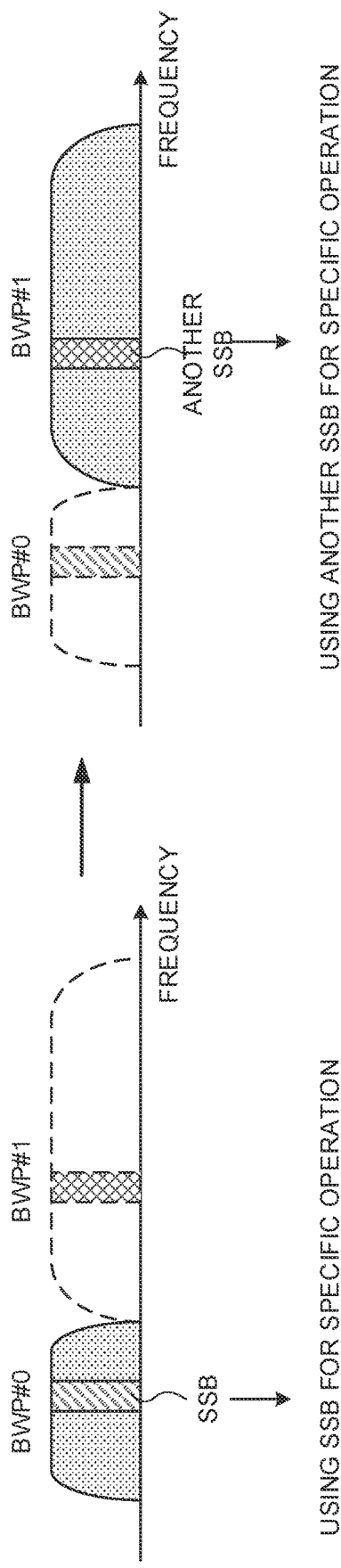
FIG. 4A and FIG. 4B are diagrams illustrating an example of using the SSB for a specific operation.

FIG. 4A illustrates a case where the BWP #0 including the SSB and the BWP #1 including another SSB are configured for the UE and the activated BWP is switched between the BWP #0 and the BWP #1. The information regarding the frequency position of the SSB corresponding to the BWP #0 and the information regarding the frequency position of another SSB corresponding to the BWP #1 may be reported from the base station to the UE in the higher layer (for example, BWP information element).

Note that when information regarding the frequency position of one SSB reported from the base station to the UE is reported using the given information element (frequencyInfoDL in ServingCellConfigCommon), it is not necessary to separately report information regarding the frequency position of the SSB by the BWP information element. Alternatively, the information regarding the frequency position of the SSB corresponding to each BWP may be reported from the base station to the UE regardless of the information regarding the frequency position of the SSB reported by the given information element. In this case, the UE can easily grasp the correspondence relationship between each BWP and the SS block based on the BWP information element.

In FIG. 4A, the UE performs various operations using at least the SSB in the BWP #0 when the BWP #0 is in the active state. When the BWP in the active state is switched from the BWP #0 to the BWP #1, the UE may perform various operations using at least another SSB in the BWP #1.

As described above, regarding the BWP including the SSB, by reporting the information regarding the frequency position of the SSB corresponding to the BWP to the UE, it becomes possible to perform various operations using the SSB included in the BWP.

When the BWP not including the SSB (BWP not including the information regarding the SSB frequency position) is configured and is brought into the active state, the UE may perform various operations using a DL signal other than the SSB (for example, CSI-RS, etc.) (see FIG. 4B).

Figure 4B:
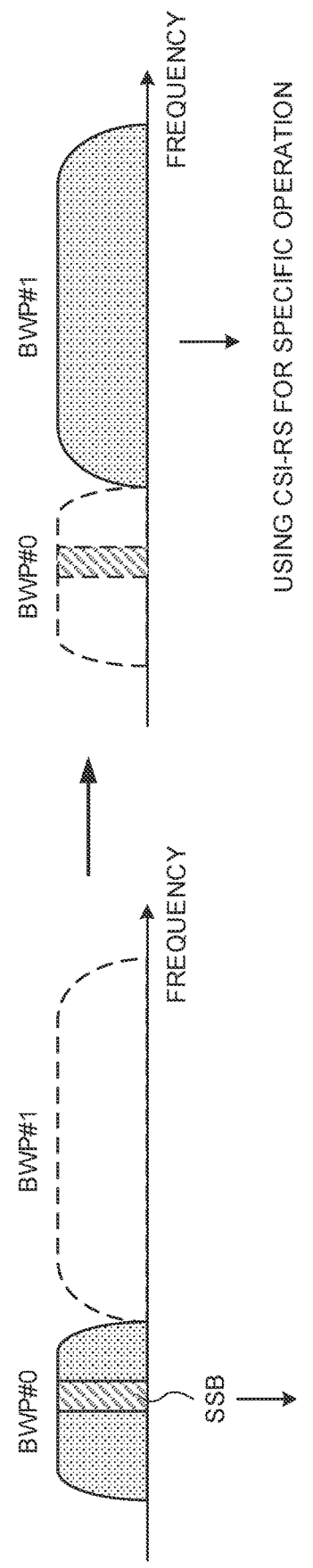

FIG. 4B illustrates a case where the BWP #0 including the SSB and the BWP #1 not including the SSB are configured for the UE and the activated BWP is switched between the BWP #0 and the BWP #1. The information regarding the frequency position of the SSB corresponding to the BWP #0 may be reported from the base station to the UE in the higher layer (for example, BWP information element).

In FIG. 4B, when the BWP #0 is in the active state, the UE performs various operations using at least the SSB in the BWP #0. When the BWP in the active state is switched from the BWP #0 to the BWP #1, the UE may perform various operations using a DL signal other than the SSB (for example, CSI-RS) in the BWP #1.

Alternatively, the SSB frequency position may be reported to the UE in association with the BWP for a specific operation. In this case, the SSB may be applied to another operation. For example, the UE may refer to the information regarding the frequency position of the SSB reported for a specific operation in a given BWP for another operation.

As an example, when the SSB is specified as a reference signal for radio link monitoring (RLM-RS), information regarding the frequency position of the SSB corresponding to RLM-RS (for example, absoluteFrequencySSB) is specified to the UE. On the other hand, the frequency position of the SSB that is a reference signal for another operation (for example, a reference signal for beam failure detection (BFD (Beam Failure Detection)-RS), etc.) is not explicitly reported to the UE.

In this case, the UE refers to the information regarding the frequency position of the SSB corresponding to the active BWP (for example, absoluteFrequencySSB in the RadioLinkMonitoringConfig information element), and performs the RLM using the SSB in the active BWP. Furthermore, the UE may use the SSB for another operation based on the information reported as the frequency position of the SSB for the RLM. When the active BWP is switched due to downlink control information, timer expiration, or the like, the UE may perform control so as to switch the SSB referred to in another operation in addition to the RLM.

As a result, by using the information regarding the frequency position of the SSB to be used for a specific operation (or as a reference signal for the specific operation) for another operation as well, overhead when the information is reported from the base station to the UE can be reduced. Further, another operation corresponding to the specific operation may be defined in advance in the specification, or may be configured in the UE from the base station in advance.

Note that here, the RLM is taken as an example of the specific operation, but the specific operation is not limited to the RLM, and may be beam recovery, beam management, or a transmission configuration index. For example, when the specific operation is beam management, the SSB may be specified as a reference signal for the beam management (for example, L1-RSRP).

Alternatively, the SSB may be used only for a specific operation in which the SSB frequency position is configured, and a reference signal other than the SSB (for example, CSI-RS) may be used for another operation in which the SSB frequency position is not configured. For example, when the information regarding the frequency position of the SSB corresponding to RLM-RS (for example, absoluteFrequencySSB) is reported (when the specific operation is the RLM), the UE performs the RLM by using the SSB. On the other hand, the UE may use another reference signal (for example, CS-RS) for another operation (for example, beam recovery, beam management, etc.) for which the use of SSB is not specified. With this, it is possible to specify the operation that uses the SSB in detail, and it is possible to flexibly configure and control the SSB, the reference signal, or the like, applied to various operations, As described above, by reporting the information regarding the SSB frequency position to the UE in association with the BWP, it becomes possible to perform various operations using the SSB while maintaining the flexibility of the BWP configuration.

(Second Aspect)

In the second aspect, various operations using the SSB are limited to the case where the BWP including the SSB frequency position reported by the given information element (for example, ServingCellConfigCommon) reported by the serving cell to be shared by the base station is in the active state.

The base station uses the given information element (ServingCellConfigCommon) to report, to the UE, a frequency position of a given SSB (for example, one SSB) in the serving cell. On the other hand, the base station may not report information on a frequency position of a SSB other than the given SSB even when the SSBs are included in the plurality of BWPs configured in the UE.

Figure 5:
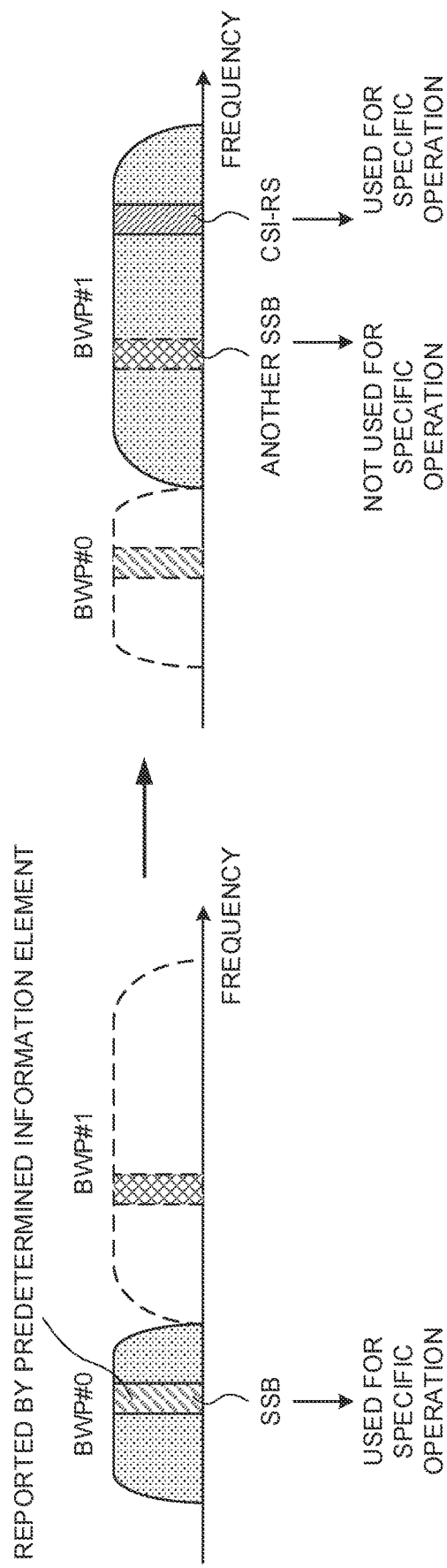
FIG. 5 is a diagram showing another example in which the SSB is used for a specific operation.

The UE controls whether or not to apply the SSB to various operations based on the type of the activated BWP (for example, whether or not the SSB of which frequency position is reported is included) (see FIG. 5). FIG. 5 illustrates a case where the active state is switched from the BWP #0 including the SSB of which frequency position is reported by the given information element (ServingCellConfigCommon) to the BWP #1 not including the SSB.

In FIG. 5, when the BWP #0 is in the active state, the UE performs various operations using at least the SSB of which frequency position is reported by the given information element in the BWP #0. On the other hand, when the BWP in the active state is switched from the BWP #0 to the BWP #1, the UE may perform various operations using another DL signal (for example, CSI-RS) included in the BWP #1.

In this case, even when the BWP #1 includes another SSB, the UE cannot grasp the frequency position of the another SSB, and therefore performs various operations using another DL signal. Further, the UE may implicitly recognize the switching operation between the SSB and another DL signal applied to various operations when there is a DCI command to switch the BWP or the timer expires.

For a specific operation (for example, beam management using L1-RSRP), measurement using the SSB and measurement using the CSI-RS can be configured. Then, the UE switches and applies the reference signal to be measured based on the type of active BWP (or the change of the active BWP).

In this way, by limiting various operations using the SSB to the case where the BWP including the SSB frequency position reported by the given information element from the base station is in the active state, even when the UE cannot grasp the SSB frequency position of each BWP, the reference signal applied to various operations can be appropriately determined.

(Third Aspect)

In the third aspect, various operations using the SSB are limited to the case where only the BWP including the SSB frequency position reported by the given information element (for example, ServingCellConfigCommon) from the base station is configured.

The base station uses the given information element (ServingCellConfigCommon) to report, to the UE, a frequency position of a given SSB (for example, one SSB) in the serving cell. Further, the base station may configure various operations using the SSB when only the BWP including the SSB frequency position reported by the given information element is configured.

Figure 6A:
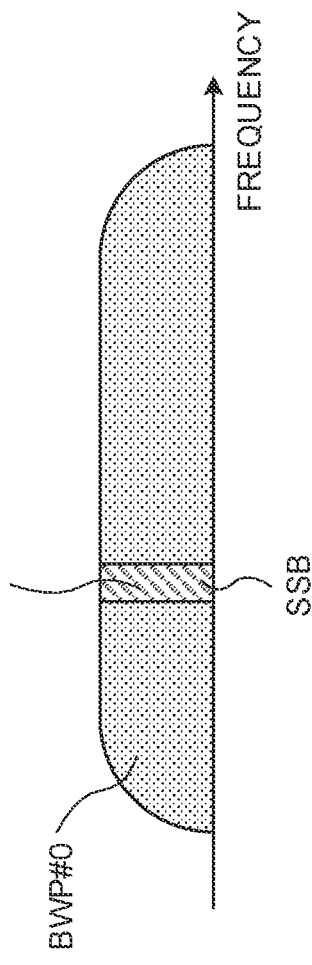
FIG. 6A and FIG. 6B are diagrams illustrating an example of the BWP including the SSB.
Figure 6B:
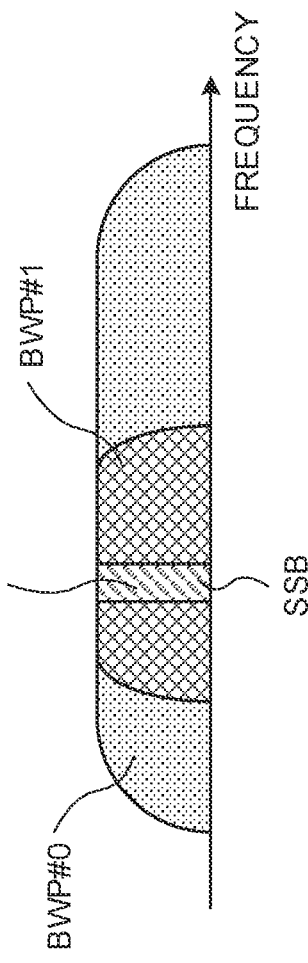

The case where only the BWP including the SSB frequency position reported by the given information element is configured may be a case where only one BWP is configured in the UE (for example, see FIG. 6A). Further, it includes not only the case where one BWP is configured, but also the case where a plurality of BWPs in which at least some of the frequency bands overlap are configured (for example, see FIG. 6B).

When various operations using the SSB are configured, the UE performs various operations without switching the frequency position of the SSB, assuming that the frequency of the SSB is included in the BWP band regardless the switched BWP.

In addition, when various operations using the SSB are configured, the UE may perform various operations without assuming that the BWP not including the SSB is configured. Alternatively, when the BWP not including the SSB is configured, the UE may assume that no operation using the SSB is performed in any of the BWPs.

Note that the third aspect may control the application/non-application for each UE. For example, at least some UEs (for example, UE of Rel.15) may assume that the BWP not including the SSB is not configured when various operations using the SSB are configured.

<Variation>

Applicability of the first aspect or the second aspect (configuring the BWP not including the SSB reported by the given information element as the BWP, and configuring various operations using the SSB in some BWPs) may be defined as UE capability information (UE capability). For example, a UE that supports the operation shown in the first aspect reports that effect to the network (for example, a base station) as UE capability information. On the other hand, a UE that does not support the operation shown in the first aspect (to which the operation shown in the second aspect is applicable) reports that effect to the base station as UE capability information.

The base station may control the presence or absence of configuration of various operations using the SSB in a given BWP for each UE based on the capability information reported from the UE.

(Radio Communication System)

Now, a configuration of a radio communication system according to one embodiment of the present disclosure will be described below. In this radio communication system, communication is performed using one or a combination of the radio communication methods according to each of the above embodiments of the present disclosure.

Figure 7:
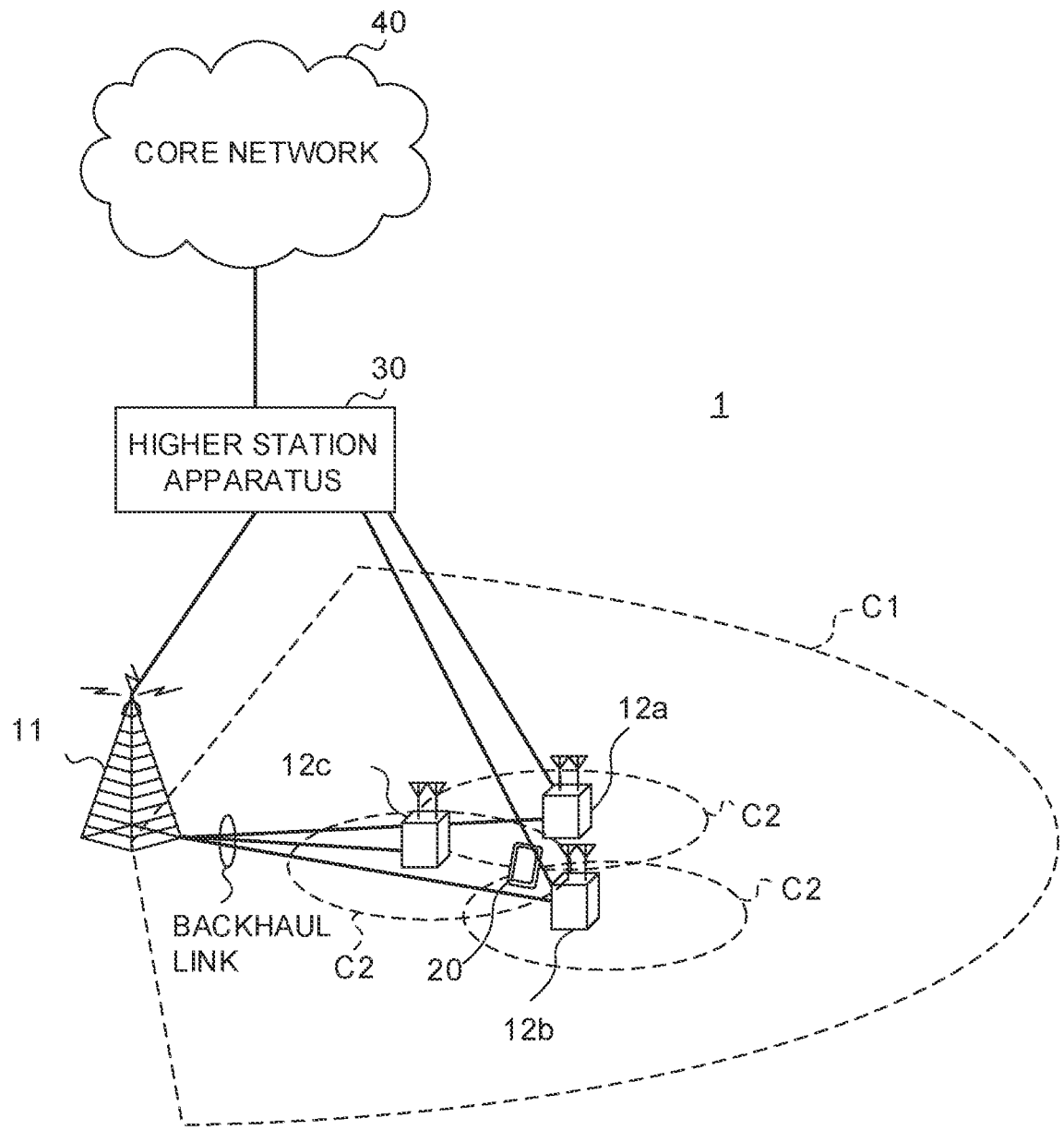
FIG. 7 is a diagram illustrating an example of a schematic structure of a radio communication system according to one embodiment.

FIG. 7 is a diagram illustrating an example of a schematic configuration of a radio communication system according to one embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

The radio communication system 1 may also be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may also be referred to as a system that implements these.

The radio communication system 1 includes a radio base station 11 that forms a macro cell C1 covering a relatively wide coverage, and radio base stations 12 (12a to 12c) that are arranged within the macro cell C1 and that form small cells C2, which are narrower than the macro cell C1. Also, user terminals 20 are arranged in the macro cell C1 and in each small cell C2. The arrangement, number and so on of each cell and the user terminals 20 are not limited to those of aspects illustrated in the drawings.

The user terminals 20 can connect with both the radio base station 11 and the radio base stations 12. It is assumed that the user terminal 20 uses the macro cell C1 and the small cells C2 simultaneously by means of CA or DC. Furthermore, the user terminals 20 may apply CA or DC using a plurality of cells (CCs).

Between the user terminals 20 and the radio base station 11, communication can be carried out using a carrier of a relatively low frequency band (for example, 2 GHz) and a narrow bandwidth (also referred to as an "existing carrier," a "legacy carrier" and so on). Meanwhile, between the user terminals 20 and the radio base stations 12, a carrier of a relatively high frequency band (for example, 3.5 GHz, 5 GHz, etc.) and a wide bandwidth may be used, or the same carrier as that used in the radio base station 11 may be used. Note that the structure of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or channel, and may indicate, for example, at least one of subcarrier spacing, bandwidth, symbol length, cyclic prefix length, subframe length, TTI length, number of symbols per TTI, radio frame configuration, specific filtering processing performed by a transceiver in a frequency domain, specific windowing processing performed by a transceiver in a time domain and so on. For example, for a certain physical channel, when the subcarrier spacing differs and/or the numbers of OFDM symbols are different between the constituent OFDM symbols, this case may be described that they are different in numerology.

The radio base station 11 and the radio base station (or two radio base stations 12) may be connected by wire (for example, means in compliance with the CPRI (Common Public Radio Interface) such as optical fiber, an X2 interface and so on) or wirelessly.

The radio base station 11 and the radio base station 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may also be referred to as a "macro base station," a "central node," an "eNB (eNodeB)," a "transmitting/receiving point" and so on. Also, the radio base stations 12 are radio base stations having local coverages, and may also be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

Each of the user terminals 20 is a terminal to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. The uplink and downlink radio access schemes are not limited to combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on are used as downlink channels. User data, higher layer control information and SIBs (System Information Blocks) are communicated in the PDSCH. Further, MIB (Master Information Block) is communicated by PBCH.

The downlink L1/L2 control channels include PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and so on. Downlink control information (DCI), including PDSCH and/or PUSCH scheduling information, and so on, is communicated by the PDCCH. DCI that schedules receipt of DL data may also be referred to as "DL assignment," and DCI that schedules transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs" and so on) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated by PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information-reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that DMRSs may also be referred to as "user terminal-specific reference signals (UE-specific Reference Signals)." Also, the reference signals to be communicated are by no means limited to these.

(Radio Base Station)

Figure 8:
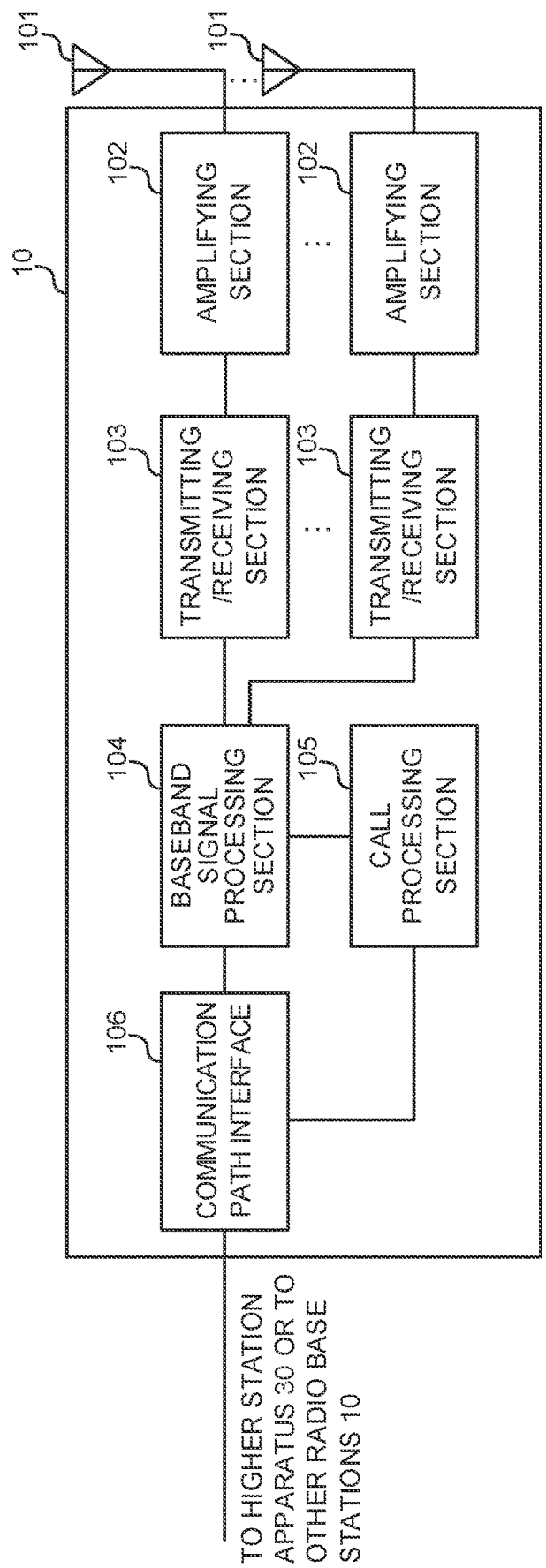
FIG. 8 is a diagram illustrating an example of an overall configuration of a radio base station according to one embodiment.

FIG. 8 is a diagram illustrating an example of an overall configuration of a radio base station according to one embodiment. Each radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processing such as channel coding and inverse fast Fourier transform, and are forwarded to the transmitting/receiving sections 103.

Each of the transmitting/receiving sections 103 converts a baseband signal, which is pre-coded for each antenna and output from the baseband signal processing section 104, into a signal in a radio frequency band, and transmits such a radio frequency signal. A radio frequency signal subjected to the frequency conversion in each transmitting/receiving section 103 is amplified in the amplifying section 102, and transmitted from each transmitting/receiving antenna 101. The transmitting/receiving section 103 can be constituted by a transmitters/receiver, a transmitting/receiving circuit or a transmitting/receiving apparatus that can be described based on general understanding of the technical field to which the present disclosure pertains. Note that the transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as configuration and releasing) for communication channels, manages states of the radio base stations 10, manages the radio resources, and so on.

The communication path interface 106 transmits and receives signals to and from the higher station apparatus 30 via a given interface. Moreover, the communication path interface 106 may transmit and receive (perform backhaul signaling for) signals with other radio base stations 10 via an inter-base station interface (for example, optical fiber in compliance with CPRI (Common Public Radio Interface), and the X2 interface).

The transmitting/receiving section 103 transmits at least one of the SSB, the CSI-RS, the RLM-RS, and L1-RS. Specifically, the transmitting/receiving section 103 transmits at least one of the synchronization signal block and the given reference signal in the given bandwidth part (BWP). Further, the transmitting/receiving section 103 may use the given information element (frequencyInfoDL in ServingCellConfigCommon) to transmit information regarding the frequency of a given SSB (for example, one SSB) to the UE. Further, the transmitting/receiving section 103 may transmit information regarding the frequency position of the SSB related to the BWP (for example, absoluteFrequencySSB in the BWP IE).

Figure 9:
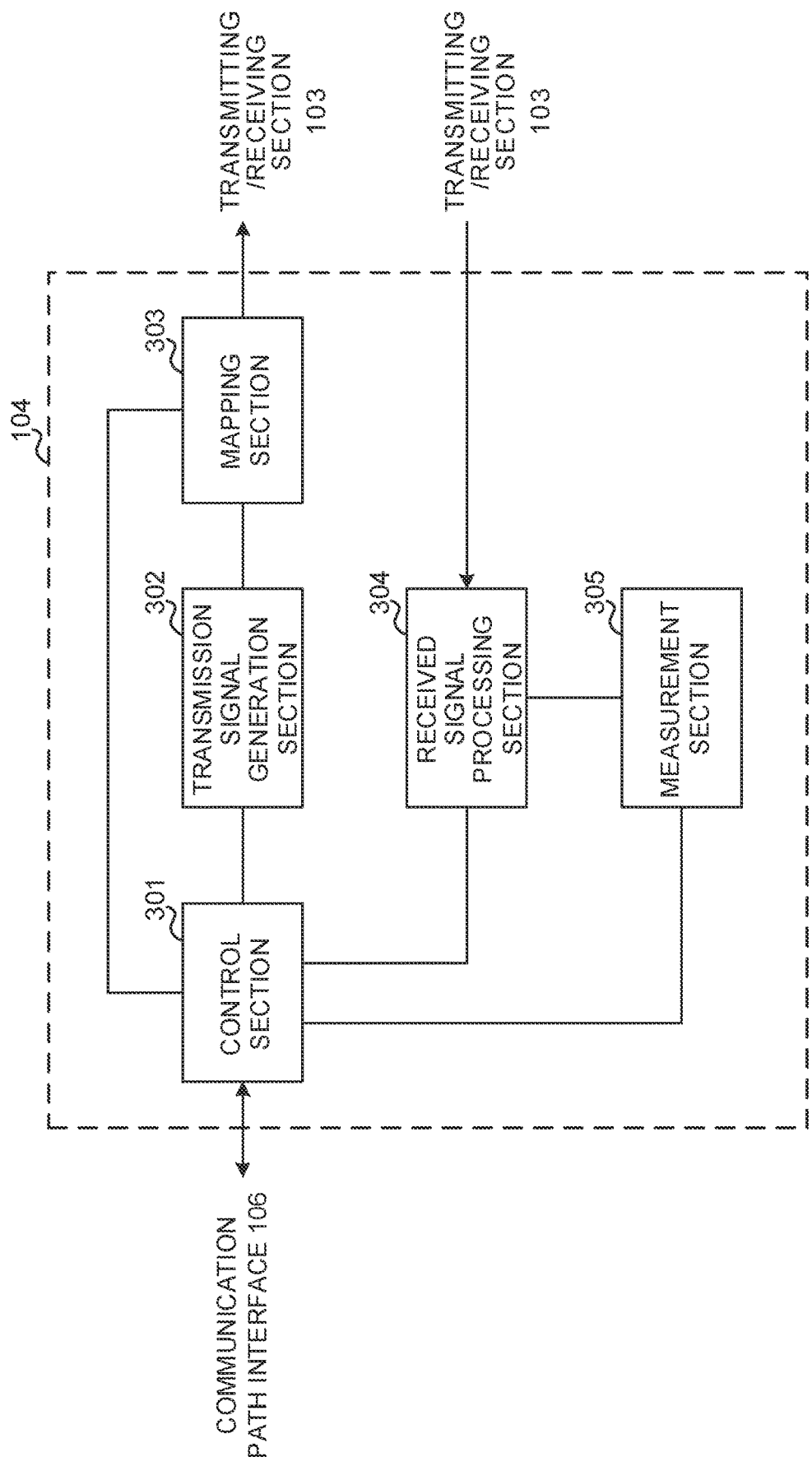
FIG. 9 is a diagram illustrating an example of a functional structure of the radio base station according to one embodiment.

FIG. 9 is a diagram illustrating an example of a functional structure of the radio base station according to one embodiment of the present disclosure. Note that, although this example will primarily show functional blocks that pertain to characteristic parts of the present embodiment, it may be assumed that the radio base station 10 has other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or a control apparatus that can be described based on general understanding of the technical field to which the present disclosure pertains.

The control section 301, for example, controls the generation of signals in the transmission signal generation section 302, the allocation of signals by the mapping section 303 and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on.

The control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals and so on.

The control section 301 performs control so as to report, to the UE, at least one of the information regarding the frequency position of the synchronization signal block commonly reported by the serving cell and the information regarding the frequency position of the synchronization signal block in the BWP.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or a signal generation apparatus that can be described based on general understanding of the technical field to which the present disclosure pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Further, the downlink data signals are subjected to coding processing and modulation processing in accordance with a coding rate and a modulation scheme, which are determined based on channel state information (CSI) reported from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or a mapping apparatus that can be described based on general understanding of the technical field to which the present disclosure pertains.

The received signal processing section 304 performs receiving processes (for example, demapping, demodulation, decoding, etc.) of received signals that are input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit or a signal processing apparatus that can be described based on general understanding of the technical field to which the present disclosure pertains.

The received signal processing section 304 outputs the decoded information that is acquired by the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or a measurement apparatus that can be described based on general understanding of the technical field to which the present disclosure pertains.

For example, the measurement section 305 may perform RRM (Radio Resource Management) measurements, channel estimations and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI), and so on. The measurement results may be output to the control section 301.

(User Terminal)

Figure 10:
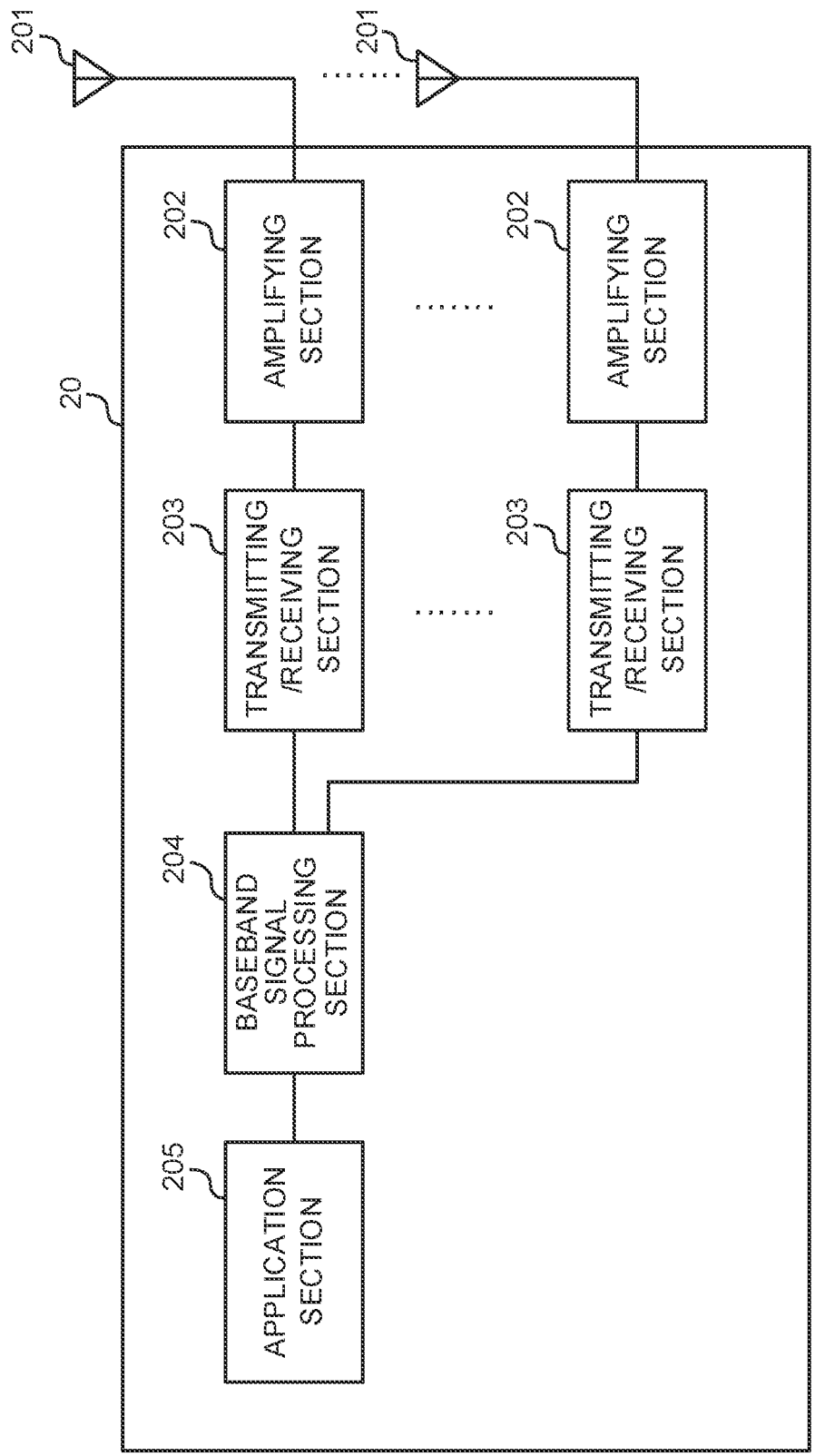
FIG. 10 is a diagram illustrating an example of an overall configuration of a user terminal according to one embodiment.

FIG. 10 is a diagram illustrating an example of an overall configuration of a user terminal according to one embodiment. The user terminal 20 includes a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving section 203 can be constituted by a transmitter/receiver, a transmitting/receiving circuit or a transmitting/receiving apparatus that can be described based on general understanding of the technical field to which the present disclosure pertains. Note that the transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

The transmitting/receiving section 203 transmits at least one of the SSB, the CSI-RS, the RLM-RS, and L1-RS. Specifically, the transmitting/receiving section 203 receives at least one of the synchronization signal block and the given reference signal in the given bandwidth part (BWP). Further, the transmitting/receiving section 203 may use the given information element (frequencyInfoDL in ServingCellConfigCommon) to receive information regarding the frequency of a given SSB (for example, one SSB). Further, the transmitting/receiving section 203 may receive information regarding the frequency position of the SSB related to the BWP (for example, absoluteFrequencySSB in the BWP IE). In addition, the transmitting/receiving section 203 may transmit information for reporting various operations using at least one of the SSB and the given reference signal.

Figure 11:
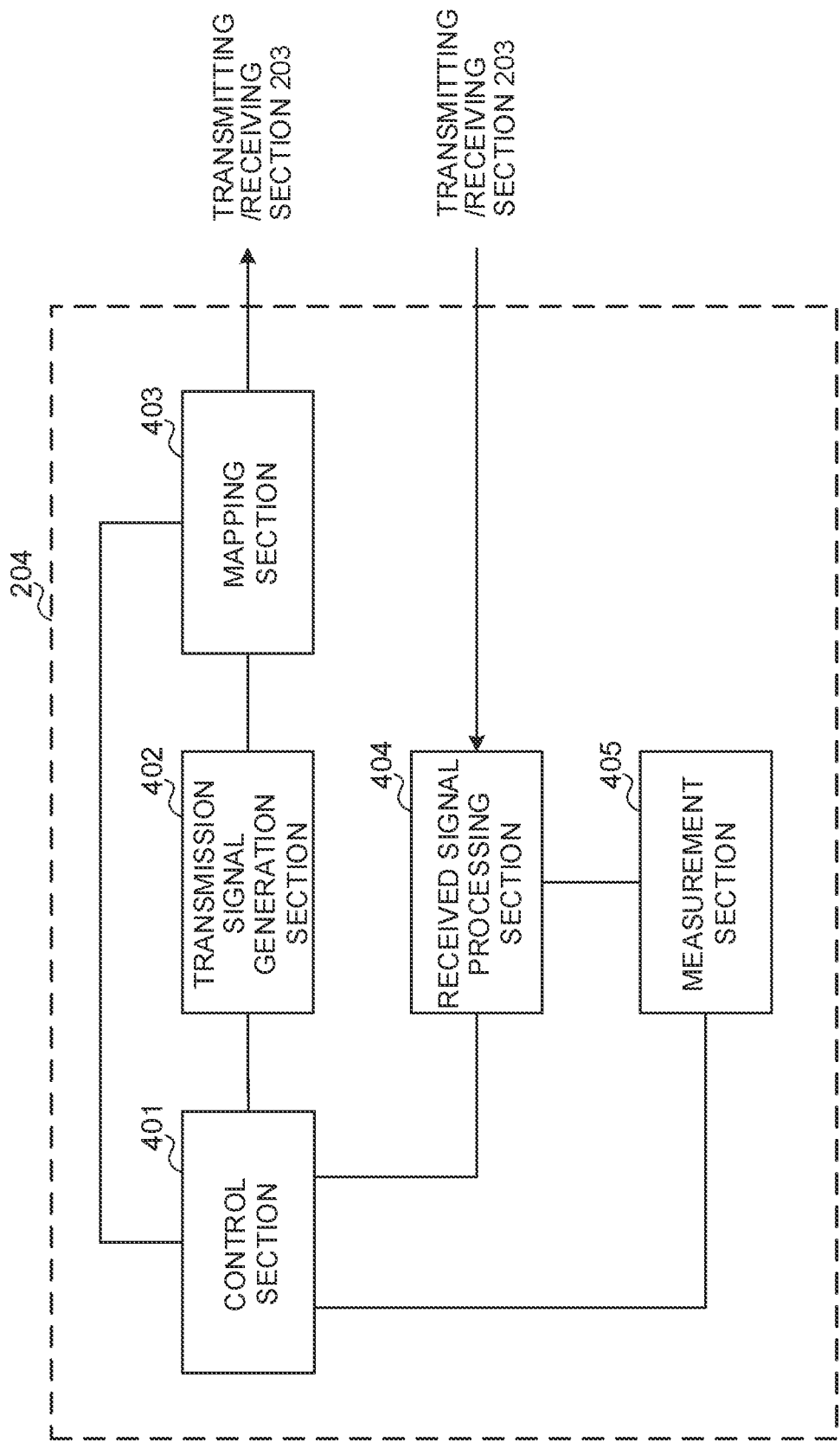
FIG. 11 is a diagram illustrating an example of a functional configuration of the user terminal according to one embodiment.

FIG. 11 is a diagram illustrating an example of a functional structure of the user terminal according to one embodiment. Note that, although this example will primarily show functional blocks that pertain to characteristic parts of the present embodiment, it may be assumed that the user terminal 20 has other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or a control apparatus that can be described based on general understanding of the technical field to which the present disclosure pertains.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405 and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may perform control to form a transmission beam and/or a reception beam using a digital BF (for example, precoding) in the baseband signal processing section 204 and/or an analog BF (for example, phase rotation) in the transmitting/receiving section 203. The control section 401 may perform control to form the beams based on downlink propagation path information, uplink propagation path information and so on. These pieces of propagation path information may be acquired from the received signal processing section 404 and/or the measurement section 405.

The control section 401 may decide whether to apply the synchronization signal block to a specific operation based on at least one of the information regarding the frequency position of the synchronization signal block commonly reported by the serving cell and the information regarding the frequency position of the synchronization signal block in the BWP.

For example, when the information regarding the frequency position of the synchronization signal block corresponding to the given BWP is reported, the control section 401 may perform control so as to perform a specific operation using the synchronization signal block. Alternatively, when the frequency position of the synchronization signal block for a first operation is reported in association with the given BWP, the control section 401 may use the synchronization signal block for a second operation in the given BWP.

Alternatively, when the frequency position of the synchronization signal block commonly reported by the serving cell is included in the given BWP, the control section 401 may perform control so as to perform a specific operation using the synchronization signal block, and perform a specific operation using a given reference signal in another BWP. Alternatively, when only the BWP including the frequency position of the synchronization signal block commonly reported by the serving cell is configured, the control section 401 may perform control so as to perform a specific operation using the synchronization signal block.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or a signal generation apparatus that can be described based on general understanding of the technical field to which the present disclosure pertains.

For example, the transmission signal generation section 402 generates uplink control signals such as delivery acknowledgment information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving section 203. The mapping section 403 can be constituted by a mapper, a mapping circuit or a mapping apparatus that can be described based on general understanding of the technical field to which the present disclosure pertains.

The received signal processing section 404 performs receiving processes (for example, demapping, demodulation, decoding, etc.) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or a measurement apparatus that can be described based on general understanding of the technical field to which the present disclosure pertains.

For example, the measurement section 405 may perform RRM measurements, channel estimations and so on based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Configuration)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be implemented by a single apparatus physically or logically aggregated, or may be implemented by directly or indirectly connecting two or more physically or logically separate apparatuses (using, for example wires, radio, etc.) and using the plurality of these apparatuses.

Figure 12:
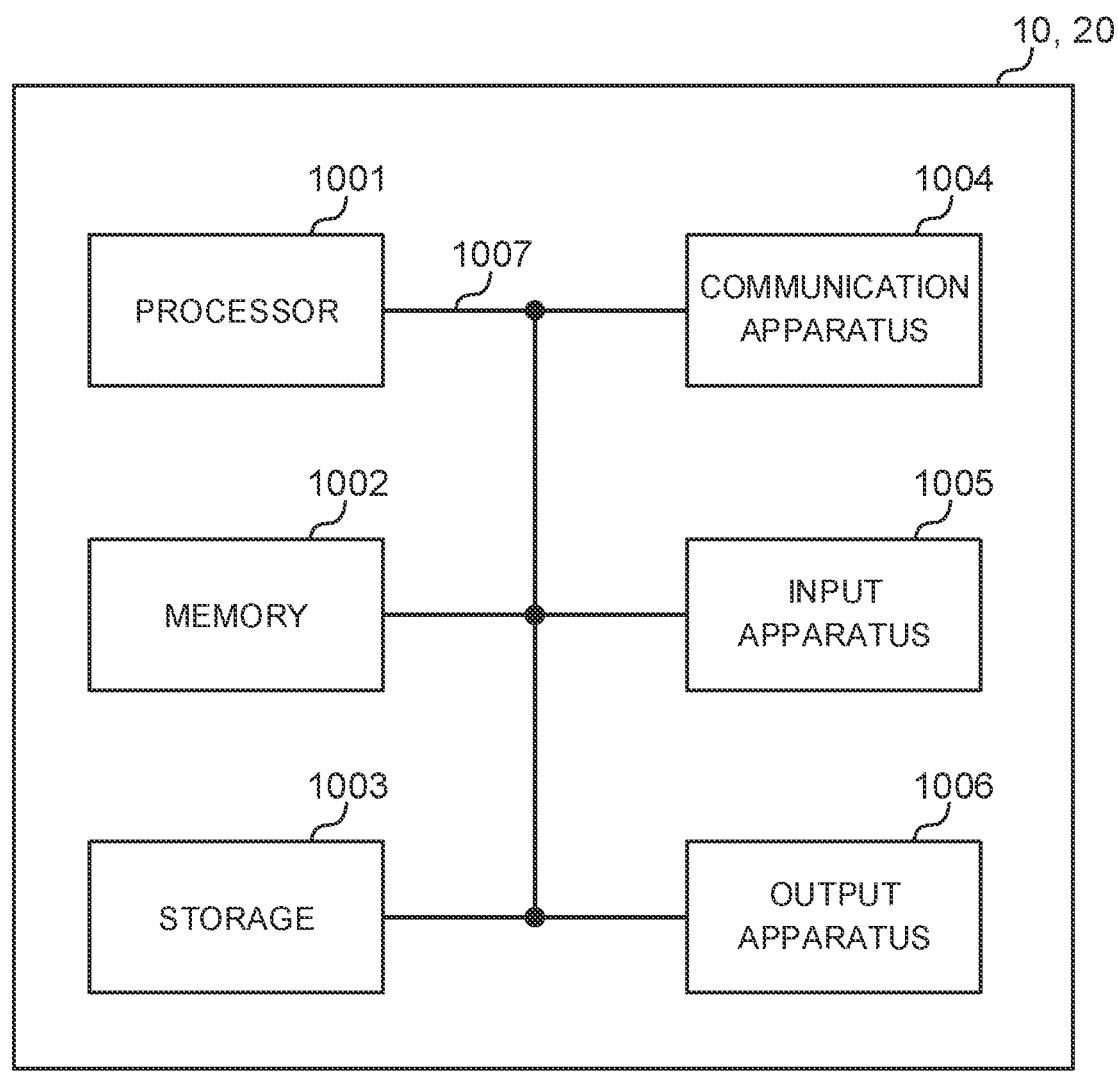
FIG. 12 is a diagram illustrating an example of a hardware configuration of each of the radio base station and the user terminal according to one embodiment.

For example, the radio base station, user terminals and so on according to one embodiment of the present disclosure may function as a computer that executes the processes of the radio communication method of the present disclosure. FIG. 12 is a diagram illustrating an example of a hardware configuration of each of the radio base station and the user terminal according to one embodiment. Physically, the above-described radio base stations 10 and user terminals 20 may be formed as a computer apparatus that includes a processor 1001, a memory 1002, a storage 1003, a communication apparatus 1004, an input apparatus 1005, an output apparatus 1006, and a bus 1007.

Note that, in the following description, the word "apparatus" may be replaced by "circuit," "device," "unit" and so on. Note that the hardware structure of the radio base station 10 and the user terminal 20 may be designed to include one or more of each apparatus illustrated in the drawings, or may be designed not to include part of the apparatus.

For example, although only one processor 1001 is illustrated, a plurality of processors may be provided. Furthermore, processes may be executed by one processor, or processes may be executed simultaneously, in sequence, or in different manners by two or more processors. Note that the processor 1001 may be implemented with one or more chips.

Each function of the radio base station 10 and the user terminal 20 is implemented, for example, in such a manner that, by causing hardware such as the processor 1001 and the memory 1002 to read predetermined software (program), the processor 1001 performs a computation, controls communication via the communication apparatus 1004, controls at least one of reading and writing of data in the memory 1002 and the storage 1003, and so on.

For example, the processor 1001 operates an operating system to control the whole of the computer. The processor 1001 may be configured with a central processing unit (CPU), which includes interfaces with peripheral apparatuses, a control apparatus, a computing apparatus, a register and so on. For example, the above-described baseband signal processing section 104 (204), call processing section 105 and so on may be implemented by the processor 1001.

Furthermore, the processor 1001 reads programs (program codes), software modules, data, or the like, from at least one of the storage 1003 and the communication apparatus 1004, into the memory 1002, and executes various processes according to these. As for the programs, programs to allow computers to execute at least part of the operations of the above-described embodiments may be used. For example, the control section 401 of the user terminal 20 may be implemented by a control program that is stored in the memory 1002 and operates in the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may also be referred to as a "register," a "cache," a "main memory (primary storage apparatus)" and so on. The memory 1002 can store a program (program code), a software module and so on, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM), etc.), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may also be referred to as a "secondary storage apparatus."

The communication apparatus 1004 is hardware (transmitting/receiving device) for allowing inter-computer communication by using at least one of wired network and wireless network, and may be referred to as, for example, a "network device," a "network controller," a "network card," a "communication module" and so on. The communication apparatus 1004 may be configured to include a high frequency switch, a duplexer, a filter, a frequency synthesizer and so on in order to implement, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device that receives input from the outside (for example, a keyboard, a mouse, a microphone, a switch, a button, a sensor, etc.). The output apparatus 1006 is an output device that implements output to the outside (for example, a display, a speaker, an LED (Light Emitting Diode) lamp, etc.). The input apparatus 1005 and the output apparatus 1006 may have an integrated configuration (for example, a touch panel).

Furthermore, the apparatuses such as the processor 1001 and the memory 1002 are connected to one another by the bus 1007 for information communication. The bus 1007 may be formed with a single bus, or may be formed with buses that vary between apparatuses.

Also, the radio base station 10 and the user terminal 20 may be configured to include hardware such as a microprocessor, a digital signal processor (DSP), an ASIC (Application-Specific Integrated Circuit), a PLD (Programmable Logic Device), and an FPGA (Field Programmable Gate Array), and all or some of each of the functional blocks may be implemented by the hardware. For example, the processor 1001 may be implemented with at least one of these pieces of hardware.

(Variations)

Note that the terminology used in the present disclosure and the terminology that is needed to understand the present disclosure may be replaced by other terms that convey the same or similar meanings. For example, at least one of "channels" and "symbols" may be replaced by "signals" (or "signaling"). Also, "signals" may be "messages." A reference signal may be abbreviated as an "RS," and may also be referred to as a "pilot," a "pilot signal" and so on, depending on which standard applies. Furthermore, a component carrier (CC) may also be referred to as a "cell," a "frequency carrier," a "carrier frequency" and so on.

A radio frame may be composed of one or more periods (frames) in a time domain. Each of one or more periods (frames) constituting a radio frame may also be referred to as a "subframe." Furthermore, a subframe may be composed of one or more slots in the time domain. The subframe may be a fixed time duration (for example, 1 ms) that is not dependent on numerology.

Here, the numerology may be a communication parameter applied to at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, a specific filtering process to be performed by a transceiver in the frequency domain, a specific windowing process to be performed by a transceiver in the time domain and so on.

The slot may be composed of one or more symbols (OFDM (Orthogonal Frequency Division Multiplexing) symbols, SC-FDMA (Single Carrier Frequency Division Multiple Access) symbols and so on) in the time domain. Further, the slot may be a unit of time based on numerology.

The slot may include a plurality of minislots. Each minislot may be composed of one or more symbols in the time domain. Also, the minislot may also be referred to as a "subslot." Each minislot may be composed of fewer symbols than a slot. PDSCH (or PUSCH) transmitted in a time unit larger than the minislots may also be referred to as "PDSCH (PUSCH) mapping type A." PDSCH (or PUSCH) transmitted using a minislot may also be referred to as "PDSCH (PUSCH) mapping type B."

The radio frame, the subframe, the slot, the minislot, and the symbol all represent the time unit in signal communication. The radio frame, the subframe, the slot, the minislot, and the symbol may be each called by other applicable names or the names may be replaced by each other.

For example, one subframe may also be referred to as "transmission time interval (TTI)," a plurality of consecutive subframes may also be referred to as "TTI," or one slot or one minislot may also be referred to as "TTI." That is, at least one of a subframe and a TTI may be a subframe (1 ms) in existing LTE, may be a shorter period than 1 ms (for example, one to thirteen symbols), or may be a longer period of time than 1 ms. Note that the unit to represent the TTI may also be referred to as a "slot," a "minislot" and so on, instead of a "subframe."

Here, a TTI refers to the minimum time unit of scheduling in radio communication, for example. For example, in LTE systems, a radio base station schedules radio resources (frequency bandwidth and transmission power that can be used in each user terminal and so on) to allocate to each user terminal on a TTI basis. Note that the definition of the TTI is not limited thereto.

The TTI may be the transmission time unit of channel-encoded data packets (transport blocks), code blocks, codewords and so on, or may be the unit of processing in scheduling, link adaptation and so on. Note that, when the TTI is given, the period of time (for example, the number of symbols) in which transport blocks, code blocks, codewords and so on are actually mapped may be shorter than the TTI.

Note that, when one slot or one minislot is referred to as a "TTI," one or more TTIs (that is, one or more slots or one or more minislots) may be the minimum time unit of scheduling. Moreover, the number of slots (the number of minislots) which constitute the minimum unit of time of the scheduling may be controlled.

A TTI having a time duration of 1 ms may also be referred to as a "normal TTI (TTI in LTE Rel.8 to 12)," a "long TTI," a "normal subframe," a "long subframe," a "slot" and so on. A TTI that is shorter than a normal TTI may also be referred to as a "shortened TTI," a "short TTI," a "partial TTI (or a fractional TTI")," a "shortened subframe," a "short subframe," a "minislot," "a sub-slot," a "slot" and so on.

Note that a long TTI (for example, a normal TTI, a subframe, etc.) may be replaced by a TTI having a time duration exceeding 1 ms, and a short TTI (for example, a shortened TTI) may be replaced by a TTI having a TTI duration less than the TTI duration of a long TTI and not less than 1 ms.

A resource block (RB) is the unit of resource allocation in the time domain and the frequency domain, and may include one or more consecutive subcarriers in the frequency domain.

Also, an RB may include one or more symbols in the time domain, and may be one slot, one minislot, one subframe, or one TTI in length. One TTI and one subframe may be each composed of one or more resource blocks.

Note that one or more RBs may also be referred to as a "physical resource block (PRB (Physical RB))," a "subcarrier group (SCG)," a "resource element group (REG)," a "PRB pair," an "RB pair" and so on.

Furthermore, the resource block may be composed of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information, parameters, and the like described in the present disclosure may be represented in absolute values or in relative values with respect to predetermined values, or may be represented using other applicable information. For example, a radio resource may be specified by a predetermined index.

The names used for parameters and so on in the present disclosure are in no respect limiting. In addition, an equation and so on using these parameters may differ from those explicitly disclosed in the present disclosure. Since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols, chips and so on that may be referenced throughout the above description, may be represented by voltages, currents, electromagnetic waves, magnetic fields or particles, optical fields or photons, or any combination of these.

Further, information, signals and so on can be output in at least one of a direction from higher layers to lower layers and a direction from lower layers to higher layers. Information, signals, and so on may be input and/or output via a plurality of network nodes.

The information, signals and so on that are input and/or output may be stored in a specific location (for example, in a memory), or may be managed in a management table. The information, signals and so on to be input and/or output can be overwritten, updated or appended. The information, signals and so on that are output may be deleted. The information, signals and so on that are input may be transmitted to other apparatuses.

The reporting of information is by no means limited to the aspects/embodiments described in the present disclosure, and may be performed using other methods. For example, the reporting of information may be implemented by physical layer signaling (for example, downlink control information (DCI), uplink control information (UCI)), higher layer signaling (for example, RRC (Radio Resource Control) signaling, broadcast information (master information block (MIB), system information block (SIB), etc.), MAC (Medium Access Control) signaling), other signals or combinations of these.

Note that physical layer signaling may also be referred to as "L1/L2 (Layer 1/Layer 2) control information (L1/L2 control signals)," "L1 control information (L1 control signal)" and so on. Also, RRC signaling may also be referred to as "RRC messages," and can be, for example, an RRC connection setup (RRCConnectionSetup) message, RRC connection reconfiguration (RRCConnectionReconfiguration) message, and so on. Moreover, the MAC signaling may be reported using, for example, MAC control elements (MAC CEs).

Further, reporting of predetermined information (for example, reporting of information to the effect that "X holds") does not necessarily have to be sent explicitly, and may be sent implicitly (for example, by not reporting this predetermined information, or by reporting another piece of information).

Decisions may be made in values represented by one bit (0 or 1), may be made in Boolean values that represent true or false, or may be made by comparing numerical values (for example, comparison with a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" as used in the present disclosure may be used interchangeably.

In the present disclosure, the terms "base station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," "bandwidth part (BWP)" and so on may be used interchangeably. The base station may also be referred to by terms such as "macro cell," "small cell," "femto cell," "pico cell" and so on.

The base station can accommodate one or more (for example, three) cells (also referred to as sectors). When the base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part or all of the coverage area of at least one of a base station and a base station subsystem that provides communication services within this coverage.

In the present disclosure, the terms "mobile station (MS)" "user terminal," "user equipment (UE)," "terminal," and so on may be used interchangeably.

A mobile station may be referred to as "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

At least one of the base station and the mobile station may also be referred to as a "transmitting apparatus," a "receiving apparatus" and so on. Note that at least one of the base station and the mobile station may be a device mounted on a moving body, a moving body itself and so on. The moving body may be a transportation (for example, a car, an airplane, etc.), an unmanned moving body (for example, a drone, an autonomous car and so on), or a (manned or unmanned) robot. Note that at least one of the base station and the mobile station also includes a device that does not necessarily move during a communication operation.

Furthermore, the radio base stations in the present disclosure may be replaced by user terminals. For example, each aspect/embodiment of the present disclosure may be applied to a configuration in which communication between a radio base station and a user terminal is replaced by communication among a plurality of user terminals (which may also be referred to as, for example, "D2D (Device-to-Device)," "V2X (Vehicle-to-Everything)," etc.). In this case, the user terminals 20 may have the functions of the radio base stations 10 described above. In addition, terms such as "uplink" and "downlink" may be replaced by a term corresponding to communication between terminals (for example, "side"). For example, an uplink channel, a downlink channel and so on may be replaced by a side channel.

Likewise, the user terminals in the present disclosure may be replaced by radio base stations. In this case, the radio base stations 10 may have the functions of the user terminals 20 described above.

Certain actions that have been described in the present disclosure to be performed by base stations may, in some cases, be performed by their upper nodes. In a network composed of one or more network nodes with base stations, it is clear that various operations that are performed so as to communicate with terminals can be performed by base stations, one or more network nodes (for example, MMEs (Mobility Management Entities), S-GWs (Serving-Gateways), etc. may be possible, but these are not limiting) other than base stations, or combinations of these.

The respective aspects/embodiments illustrated in the present disclosure may be used individually or in combinations, which may be switched depending on the aspect of implementation. The order of processes, sequences, flowcharts and so on that have been used to describe the respective aspects/embodiments in the present disclosure may be re-ordered as long as inconsistencies do not arise. For example, regarding the methods described in the present disclosure, elements of various steps are presented using an illustrative order, and are not limited to the presented particular order.

The respective aspects/embodiments described in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these. Further, a plurality of systems may be combined and applied (for example, a combination of LTE or LTE-A and 5G, etc.).

The phrase "based on" as used in the present disclosure does not mean "based only on," unless otherwise specified. In other words, the phrase "based on" means both "based only on" and "based at least on."

Reference to elements with designations such as "first," "second" and so on as used in the present disclosure does not generally limit the number/quantity or order of these elements. These designations may be used in the present disclosure only for convenience, as a method for distinguishing between two or more elements. Hence, references of first and second elements do not mean that only two elements may be adoptable, or that the first element must precede the second element in some way.

The terms "judge" and "determine" as used in the present disclosure may encompass a wide variety of actions. For example, to "judge (determine)" as used herein may be interpreted to mean making judgements (determinations) related to judging, calculating, computing, processing, deriving, investigating, looking up (for example, searching a table, a database or some other data structure), ascertaining and so on.

Furthermore, to "judge (determine)" as used herein may be interpreted to mean making judgements (determinations) related to receiving (for example, receiving information), transmitting (for example, transmitting information), inputting, outputting, accessing (for example, accessing data in a memory) and so on.

In addition, to "judge (determine)" as used herein may be interpreted to mean making judgements and determinations related to resolving, selecting, choosing, establishing, comparing, and so on. In other words, to "judge (determine)" as used herein may be interpreted to mean making judgements and determinations related to some action.

In addition, to "judge (determine)" as used herein may be replaced by "assuming," "expecting," "considering" and so on.

As used in the present disclosure, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced by "access."

In the present disclosure, when two elements are connected, these elements may be considered "connected" or "coupled" to each other by using one or more electrical wires, cables, printed electrical connections and so on, and, as a number of non-limiting and non-inclusive examples, by using electromagnetic energy, such as electromagnetic energy having wavelengths in the radio frequency, microwave and optical (both visible and invisible) regions.

In the present disclosure, the phrase "A and B are different" may mean "A and B are different from each other." The terms such as "leave" "coupled" and so on may be interpreted as well.

When the terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, when articles, such as "a," "an," and "the" in English, are added by translation in the present disclosure, the present disclosure may include that nouns which follows these articles are in plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives information regarding a frequency of a synchronization signal block to be shared with a first bandwidth part (BWP) and a second BWP in a serving cell; and
a processor that, when the first BWP is active, performs radio link monitoring by using the synchronization signal block, and when the second BWP that shares the frequency of the synchronization signal block with the first BWP is active, performs radio link monitoring by using a channel state information-reference signal (CSI-RS).

2. The terminal according to claim 1, wherein the receiver receives information regarding correspondence between the synchronization signal block and the first BWP, and the processor performs, based on the information regarding correspondence between the synchronization signal block and the first BWP, the radio link monitoring by using the synchronization signal block.

3. The terminal according to claim 1, wherein, when a frequency of the first BWP includes the frequency of the synchronization signal block, the processor performs the radio link monitoring by using the synchronization signal block in the first BWP.

4. The terminal according to claim 2, wherein, when a frequency of the first BWP includes the frequency of the synchronization signal block, the processor performs the radio link monitoring by using the synchronization signal block in the first BWP.

5. A radio communication method for a terminal, comprising:
receiving information regarding a frequency of a synchronization signal block to be shared with a first bandwidth part (BWP) and a second BWP in a serving cell; and
when the first BWP is active, performing radio link monitoring by using the synchronization signal block, and when the second BWP that shares the frequency of the synchronization signal block with the first BWP is active, performing radio link monitoring by using a channel state information-reference signal (CSI-RS).

6. A base station comprising:
a transmitter that transmits information regarding a frequency of a synchronization signal block to be shared with a first bandwidth part (BWP) and a second BWP in a serving cell; and
a processor that, when the first BWP is active, controls reception of a first radio link monitoring result, the first radio link monitoring being performed by using the synchronization signal block, and when the second BWP that shares the frequency of the synchronization signal block with the first BWP is active, controls reception of a second radio link monitoring result, the second radio link monitoring being performed by using a channel state information-reference signal (CSI-RS).

7. A system comprising a base station and a terminal, wherein
the base station comprises:
a transmitter that transmits information regarding a frequency of a synchronization signal block to be shared with a first bandwidth part (BWP) and a second BWP in a serving cell; and
a first processor that, when the first BWP is active, controls reception of a first radio link monitoring result, the first radio link monitoring being performed by using the synchronization signal block, and when the second BWP that shares the frequency of the synchronization signal block with the first BWP is active, controls reception of a second radio link monitoring result, the second radio link monitoring being performed by using a channel state information-reference signal (CSI-RS), and
the terminal comprises:
a receiver that receives the information; and
a second processor that, when the first BWP is active, performs the radio link monitoring by using the synchronization signal block, and when the second BWP that shares the frequency of the synchronization signal block with the first BWP is active, performs the radio link monitoring by using the CSI-RS.

* * * * *